US008572474B1

(12) United States Patent
Mukherjee et al.

(10) Patent No.: US 8,572,474 B1
(45) Date of Patent: Oct. 29, 2013

(54) PRINTING NON-VISIBLE, OVERFLOWING CONTENT BY PLACING AN INDICATOR IN A TEXT BOX AND PRINTING THE CONTENT OUTSIDE THE BOUNDARIES OF THE TEXT BOX

(75) Inventors: Anubhav Mukherjee, Delhi (IN); Narinder Beri, Jalandhar (IN); Abhishek Naveen Hegde, Noida (IN); Mohd. Fahadullah, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 1679 days.

(21) Appl. No.: 11/799,919

(22) Filed: May 3, 2007

(51) Int. Cl.
*G06F 17/00* (2006.01)

(52) U.S. Cl.
USPC .......................... 715/224; 715/221; 715/225

(58) Field of Classification Search
USPC ........................................................ 715/225
See application file for complete search history.

(56) References Cited

U.S. PATENT DOCUMENTS

| 6,826,727 | B1 | 11/2004 | Mohr et al. |
| 6,832,351 | B1 * | 12/2004 | Batres ............................ 715/234 |
| 7,068,288 | B1 | 6/2006 | Good et al. |
| 7,143,347 | B2 | 11/2006 | Su |
| 2003/0093497 | A1 * | 5/2003 | Ohashi ........................ 709/217 |
| 2004/0105127 | A1 * | 6/2004 | Cudd et al. ................... 358/1.18 |
| 2005/0229096 | A1 | 10/2005 | Kiesekamp et al. |
| 2006/0010104 | A1 | 1/2006 | Pettinati et al. |
| 2006/0041545 | A1 | 2/2006 | Heidloff et al. |
| 2006/0059418 | A1 * | 3/2006 | Elkady ........................ 715/508 |
| 2006/0085761 | A1 | 4/2006 | Allen et al. |
| 2007/0083811 | A1 | 4/2007 | Matsuo et al. |

OTHER PUBLICATIONS

CSS Creator; CSS Forum: "Print contents of a textbox"; Feb. 15, 2006; pp. 1-2.*
USPTO; "OACS User's Training Manual"; Feb. 2003; Version 1.3; pp. 2-90-2-93.*
Bos, Bert et al.; "Cascading Style Sheets, level 2 revision 1 (CSS 2.1 Specification)"; W3C; Working Draft Nov. 6, 2006, pp. 1-363.*

* cited by examiner

*Primary Examiner* — Stephen Hong
*Assistant Examiner* — Asher Kells
(74) *Attorney, Agent, or Firm* — Kilpatrick Townsend & Stockton LLP (57) ABSTRACT

Printing non-visible, overflowing text is described, including detecting text boxes with visible and non-visible content, the text boxes being disposed in a file, retrieving the visible and non-visible content from at least one of the text boxes, and generating a printout of the file, the printout having the file and the visible and non-visible content of at least one of the text boxes.

30 Claims, 8 Drawing Sheets

PRINTING NON-VISIBLE, OVERFLOWING CONTENT BY PLACING AN INDICATOR IN A TEXT BOX AND PRINTING THE CONTENT OUTSIDE THE BOUNDARIES OF THE TEXT BOX

FIELD OF THE INVENTION

The present invention relates generally to software and file printing. More specifically, printing non-visible, overflowing text is described.

BACKGROUND

Conventionally, various document formats (e.g., HTML, Adobe PDF, etc.) contain form fields. Text boxes are a type of form field configured to accept text input from a user. Text boxes are typically placed on a document page along with form fields and other objects, such as images. The rectangle (i.e., bounding box) of the text box on a page is fixed and cannot be resized because the creator (i.e., user, author, editor) of the page has allotted space to each object on the page during layout. Thus, a text box can not be resized because it will overlap another object, such as an image. If the text content ("content") input by a user does not fit in the rectangle of the text box, conventional applications (e.g., web browsers, Adobe PDF viewers, etc.) add a horizontal or vertical scrollbar to the width or height of the text box rectangle, respectively when the page is being rendered on a screen or display. The user can move the scrollbar to view the entire content (i.e., visible and non-visible content) of the text box. However, when conventional solutions are used to print a page that contains a text box with both visible and non-visible content, only the visible content is printed. Thus, a user cannot see the non-visible content of the text box on the printed page.

Obtaining non-visible content of text boxes in a printed document is time-consuming and labor-intensive using conventional solutions. The user must copy the content of each text box with non-visible content to a new document, switching between the document with the text boxes and the new document. Once finished, the new document is then printed with the entire content of the copied text boxes. This is tedious and inefficient as the user must create and manage a separate document for the non-visible text. Further, if the document has many text boxes with non-visible content, this would be extremely time-consuming and prone to error. Also, the new document would be confusing, having no reference to the original document.

Thus, a solution for printing non-visible content of text boxes without the limitations of conventional techniques is needed.

BRIEF DESCRIPTION OF THE DRAWINGS

Various examples are disclosed in the following detailed description and the accompanying drawings.

DETAILED DESCRIPTION

Various examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

In some examples, the described techniques may be implemented as an application or as a module or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Flex™, Java™, Javascript™, Ajax, COBOL, Fortran, ADA, XML, HTML, DHTML, XHTML, HTTP, XMPP, and others. Design, publishing, and other types of applications such as Dreamweaver®, Shockwave®, and Fireworks® may also be used to implement the described techniques. The described techniques may be varied and are not limited to the examples or descriptions provided.

Printing non-visible content of text boxes is described. In some examples, a file (e.g., web page, Adobe PDF document, and others) may contain one or more text boxes. In some examples, the rectangle (i.e., bounding box) of the text box is fixed. If the text content ("content") input by a user does not fit in the rectangle of the text box, then the text box may have visible and non-visible content. In generating a printout of the file (e.g., printing the file, viewing the print preview, and others), the visible and non-visible content may be retrieved and incorporated in the printout. In some examples, the visible and non-visible content may be printed in a reference guide at the end of the file. In other examples, the visible and non-visible content may be printed on a new page following the page including the text box from which the content was retrieved. In still other examples, the visible and non-visible content may be printed on the same page as the page including the text box from which the content was retrieved.

In some examples, a reference indicator may be assigned to a text box with visible and non-visible content. In generating a printout of the file, a reference indicator may replace the content of the text box in the text box rectangle, and at locations where visible and non-visible content is printed (e.g., in a reference guide at the end of the file, on a new page following the page including the text box, on the same page as the page including the text box, and others), a reference indicator may be substantially situated with the visible and non-visible content from the text box. In some examples, substantially situated may refer to associating a reference indicator with text, content, characters, numerals, or other material of a text box on a page. For example, a reference indicator may be substantially situated with visible and non-visible content associated with a text box by placing the reference indicator on the same line as the start of the visible and non-visible content printed at the bottom of a page. In some examples, a reference indicator substantially situated with visible and non-visible content of a text box may be a preceding superscript, subscript, printed in a different font or type set, and the like. A reference indicator substitution may occur when generating a printout of the file, and a printed file may remain unchanged. The described techniques enable a user to obtain the non-visible content from a text box on a printed page without tedious, manual copying and pasting. Further, a reference indicator printed in a text box rectangle and substantially situated with the visible and non-visible content of a text box enables ease of reference.

Figure 1:
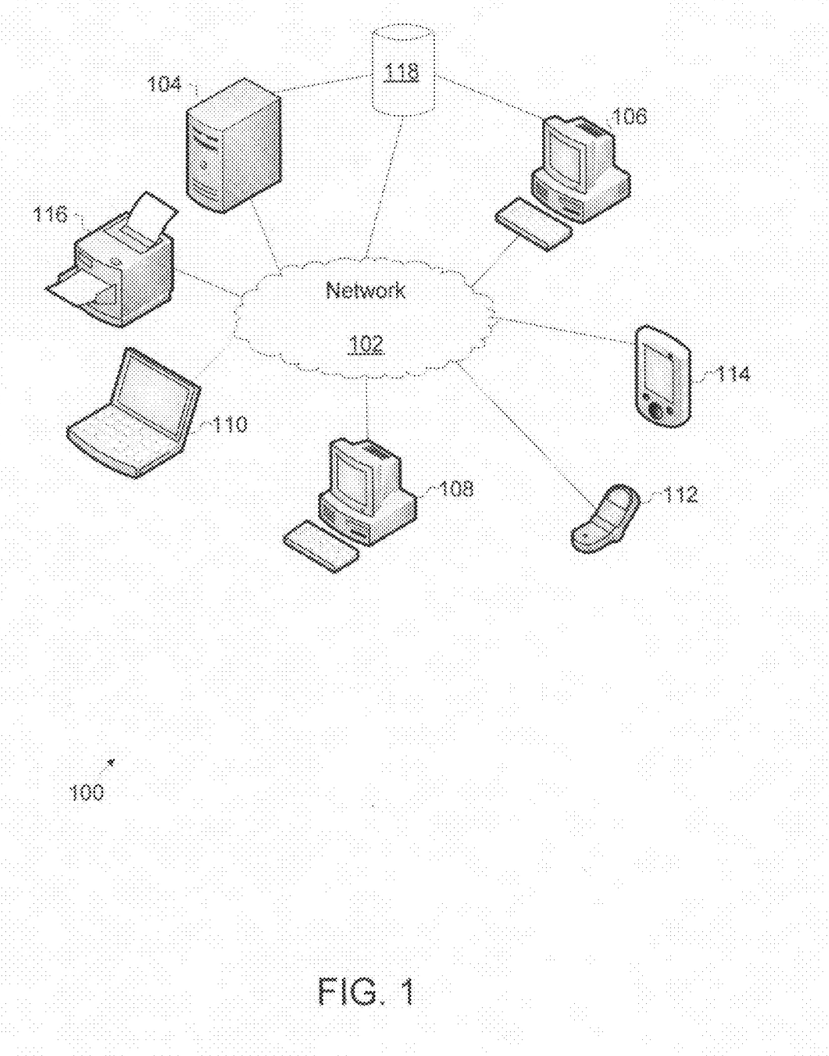
FIG. 1 illustrates an exemplary file printing system.

FIG. 1 illustrates an exemplary file printing system. Here, system 100 includes network 102, server 104, clients 106-116, and database 118. System 100 may be used to implement the described techniques for printing non-visible content of text boxes. In some examples, network 102 may be implemented using the Internet, a local area network (LAN), wide area network (WAN), municipal area network (MAN), wireless local area network (WLAN), or any other type or topology of network apart from those described herein. Further, direct and indirect connections and couplings may be provided between clients 106-116 across network 102, which may also be implemented using one or more networks. As an example, clients 106-116 may be implemented using endpoint devices such as a desktop or laptop computer, mobile computing device, personal digital assistant (PDA), smart phone, camera phone, printer, and others. System 100 is not limited to any particular type of client and various types other than those described above may be used. Further, network connections or couplings between the above-described elements in system 100 may be varied and are also not limited to the examples provided.

In some examples, clients 106-116 may be implemented using various types of endpoint devices. For example, clients 106-108 may be implemented using endpoint devices such as personal computers (PC) or any other type of computing device. Further, clients 110-116 may be implemented as notebook/laptop computers, cell/smart phones, personal digital assistants (PDAs), or printers, respectively. In other examples, clients 106-116 may be implemented using any type of endpoint or computing device.

In other examples, server 104 may be implemented and used to deliver (i.e., serve) content, information, or data requested by one or more of clients 106-116. For example, content requested by client 106 may be performed using a web browsing application (not shown) installed on client 106. Content may include text, documents, files, images, photos, applications, or any type of information or data. When requested from server 104, content may be delivered to the requesting client (i.e., clients 106-116). In other examples, server 104 may be a server configured for a given purpose (e.g., ad server, web server, content server, application server, web services, gateway, and others). When requested from server 104, content may be delivered to the requesting client (i.e., clients 106-116). Techniques for printing non-visible content of text boxes such as those described herein may be implemented using the above-described system and topology. In some examples, printing non-visible content of text boxes may be performed locally on one or more of clients 106-116. In other examples, printing non-visible content of text boxes may be performed remotely or in a distributed manner using server 104 and one or more of clients 106-116. Further, other system configurations, topologies, clients, end and intermediate devices, and implementation techniques may be used and are not limited to those described above.

Figure 2:
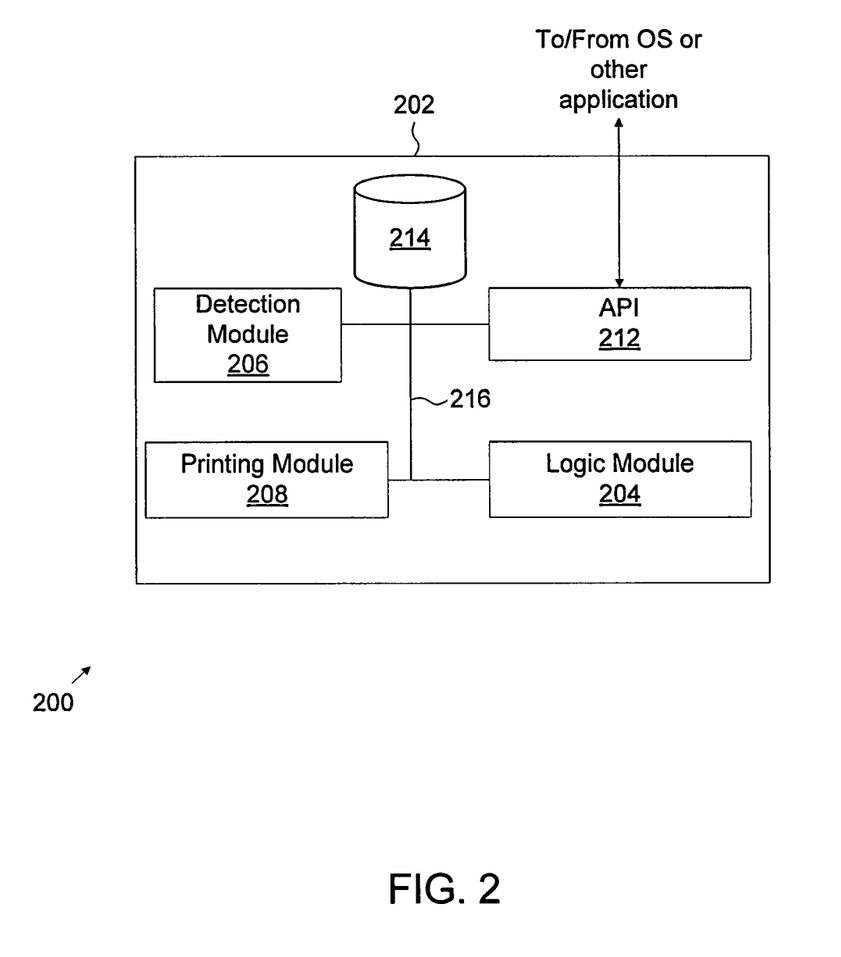
FIG. 2 illustrates an exemplary file printing application.

FIG. 2 illustrates an exemplary file printing application. Here, system 200 includes application 202, logic module 204, detection module 206, printing module 208, application programming interface (API) 212, repository 214, and data bus 216. In some examples, logic module 204, detection module 206, printing module 208, API 212, and repository 214 may be configured to transfer data between each other using data bus 216. In other examples, repository 214 may be a remote repository, which may be networked directly or indirectly to application 202. Data may be stored in either repository 214 or a remote repository (not shown), and data may be organized into files. Files may include data associated with documents, images, text, applications, program or software code, photos, or any other type of data that may be grouped together as a stream of bits (e.g., "1," "0," or any other data representation using binary, tertiary, or any other type of number system using a different mathematical base) that may be opened, accessed, launched, executed, run, downloaded, or otherwise operated upon as a single unit or instantiation. Further, files may include content such as editorial text, text boxes, form fields, or other content (e.g., files, advertisements, documents, articles, web sites and pages, videos, web services-delivered content and applications, and others) formatted in various types of formats using different applications (e.g., desktop, web browsing, messaging, e-mail, spreadsheet, and others). In some examples, files retrieved from repository 214 may be opened and launched based on the type of file retrieved. For example, a web site having text boxes and form fields may be retrieved from repository 214. As another example, a web site having video and audio data may be streamed as a data stream from repository 214. As yet another example, an audio file may be downloaded, retrieved, streamed, or otherwise accessed from repository 214.

As an example, a transaction flow initiated by a print interaction with a file may be communicated using API 212 from another application (e.g., web browsing, desktop, e-mail, messaging, or other) or operating system, thus enabling detection of the file to be printed. Detection module 206 may be configured to detect one or more text boxes with visible and non-visible content. Text boxes may be identified by a tag (e.g., <input type="text">, <textarea>, and others). In some examples, text boxes with non-visible content may be identified by comparing the height of the text box rectangle with the height of the text box content. If the height of the text box content exceeds the height of the text box rectangle, then the text box contains non-visible content. In other examples, text boxes with non-visible content may be identified by comparing the width of the text box rectangle with the width of the text box content. If the width of the text box content exceeds the width of the text box rectangle, then the text box contains non-visible content. In still other examples, text boxes with non-visible content may be identified by detecting a scrollbar on the text box, indicating that the height or width of the text box content exceeds the height or width of the text box rectangle. Logic module 204 may be implemented to provide logic, control, coordination, command, signaling, and other functions and features for application 202. For example, logic module 204 may be configured to retrieve visible and non-visible content of the text boxes in a file.

Printing module 208 may be configured to generate a printout of a file, where the printout includes the file and the visible and non-visible content of the text boxes. In some examples, visible and non-visible content may be printed in a reference guide at the end of the file. A reference guide may be a separate page, portion, or section of a document that includes the visible and non-visible content as well as reference indicators or other notations that correlate the visible and non-visible content to sections of a document. In other examples, visible and non-visible content may be printed on a new page following the page including the text box from which the content was retrieved. In still other examples, visible and non-visible content may be printed on the same page as the page including the text box from which the content was retrieved. In some examples, a reference indicator may be assigned to a text box with visible and non-visible content. In generating a printout of the file, the reference indicator may replace the content of the text box in the text box rectangle, and wherever the visible and non-visible content is printed (e.g., in a reference guide at the end of the file, on a new page following the page including the text box, on the same page as the page including the text box, and others), the reference indicator may be substantially situated with the visible and non-visible content from that text box. The reference indicator substitution may occur when generating a printout of the file and a printed file may remain unchanged. In other examples, system 200 and the described elements may be varied in implementation, function, or structure and are not limited to the examples provided.

Figure 3A:
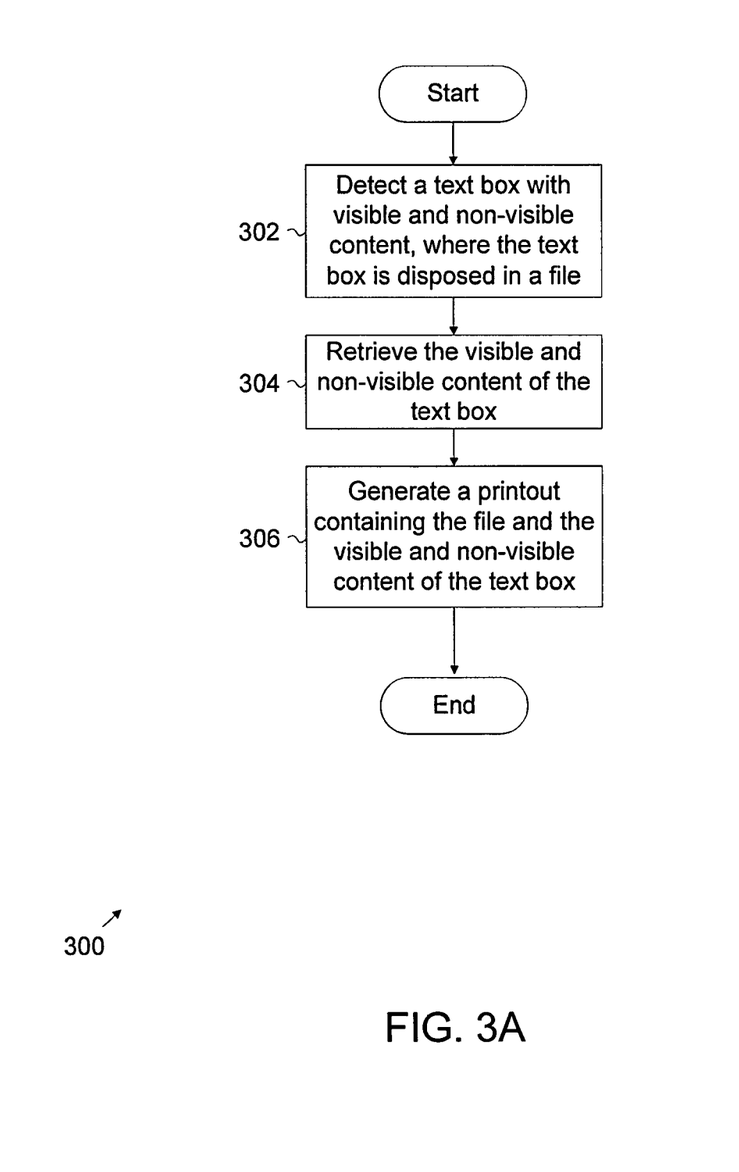
FIG. 3A illustrates an exemplary file printing process.

FIG. 3A illustrates an exemplary file printing process. Here, process 300 starts by detecting a text box with visible and non-visible content, where the text box is disposed in a file (302). In some examples, detecting a text box with visible and non-visible content may be performed as further described below in connection with FIG. 3B. Here, once a text box with non-visible content is detected, visible and non-visible content of a text box is retrieved (304). A printout may be generated that includes the file and visible and non-visible content of the text box (306). In some examples, visible and non-visible content may be printed in a reference guide at the end of the file. In other examples, visible and non-visible content may be printed on a new page following the page including the text box from which the content was retrieved. In still other examples, visible and non-visible content may be printed on the same page as the page including the text box from which the content was retrieved. In some examples, a reference indicator may be assigned to a text box with visible and non-visible content. In generating a printout of a file, a reference indicator may replace the content of a text box in a text box rectangle. Where visible and non-visible content is printed (e.g., in a reference guide at the end of a file, on a new page following the page including the text box, on the same page as the page including the text box, or others), a reference indicator may be substantially situated (i.e., printed on the same page, indicated in the same section of text, included with the same document, or others). A reference indicator substitution may occur when generating a printout of a printed file, and a printed file may remain unchanged. In other examples, the above-described process may be varied and is not limited to the processes or sub-processes described above.

Figure 3B:
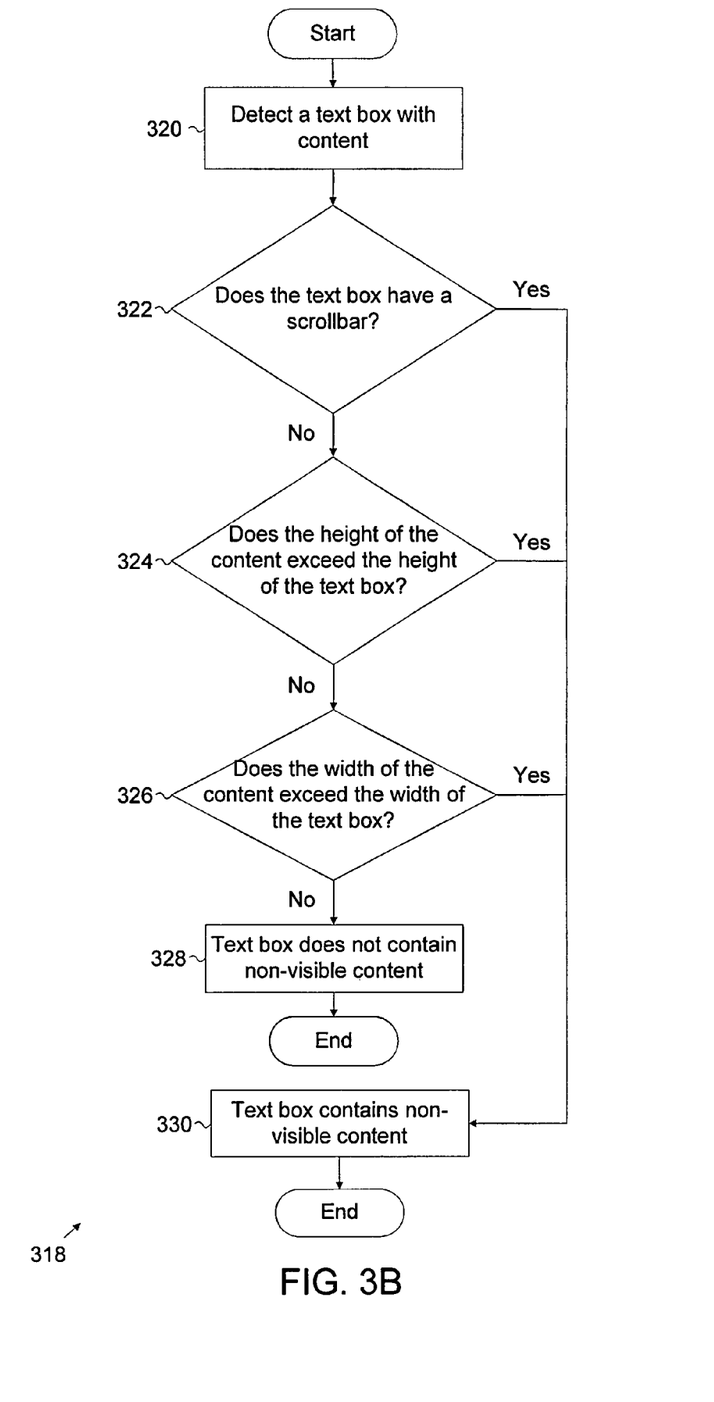
FIG. 3B illustrates an exemplary file printing sub-process.

FIG. 3B illustrates an exemplary file printing sub-process. In some examples, sub-process 318 further describes detecting a text box with visible and non-visible content (e.g., 302 (FIG. 3A)), as provided above. Here, a text box with content is detected (320). In some examples, text boxes, a type of form field, may be identified by tags. As an example, in HTML, form fields are identified by tags (e.g., <input>, <button>, and others), which may be embedded inside a <form> tag. Text box form fields may be associated with tags such as <input type="text"> or <textarea>. As another example, in document editing, authoring, or other similar applications, form fields have a separate dictionary. In some examples, different form fields are identified by a key Field Type ("FT"), and the text box form field is identified by the "Tx" Field Type. A determination is made as to whether the text box has a scrollbar (322). Some applications (e.g., web browsers, portable document format and other types of reader/viewer applications, and others) may add a horizontal or vertical scrollbar to the text box rectangle if the text content entered by a user does not fit in the rectangle of the text box. As an example, if the text box has a scrollbar on the side of the text box rectangle, the text content may exceed the height of the text box rectangle. As another example, if the text box has a scrollbar on the bottom of the text box rectangle, the text content may exceed the width of the text box rectangle. If the text box has a scrollbar, the text box may include non-visible content (330) and the process ends. If the text box does not have a scrollbar, the text box may still include non-visible content, but the application may not have added a scrollbar. Thus, the process continues to determine whether the text box contains non-visible content.

A determination is made as to whether the height of the content exceeds the height of the text box rectangle (324). As an example, the height of the content may be determined by adding the height of each line of text with the height of the gap between each line. If the total height of the text content exceeds the height of the text box rectangle, then the text box includes non-visible content (330) and the process ends. If the height of the content does not exceed the height of the text box, the process continues. A determination is made as to whether the width of the content exceeds the width of the text box rectangle (326). As an example, the width of the content may be determined by adding up the width of each character in a line of text, for each line of text. If the width of the text of any line exceeds the width of the text box rectangle, then the text box may include non-visible content (330) and the process ends. If the width of the content does not exceed the width of the text box, the text box does not contain non-visible content (328) and the process ends. The above-described process may be varied in implementation, design, order, and function and is not limited to the examples provided above.

Figure 4:
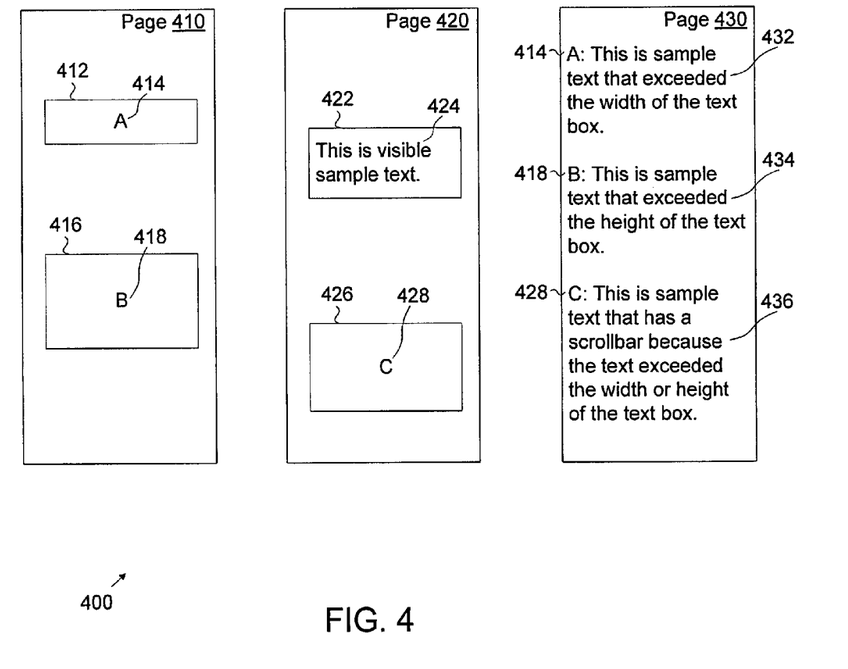
FIG. 4 illustrates an exemplary printed file.

FIG. 4 illustrates an exemplary printed file. Here, printed file 400 includes page 410, text box rectangle 412, text box rectangle 416, reference indicator 414, reference indicator 418, page 420, text box rectangle 422, text box rectangle 426, text box content 424, reference indicator 428, page 430, text box content 432, text box content 434, and text box content 436. Page 410 and page 420 are pages from printed file 400, and page 430 is a new page in printed file 400. In some examples, page 430 may be more than one printed page if visible and non-visible text box contents 432-436 exceed one page in length. In other examples, file 400 may contain more or fewer text boxes. Although letters are used as reference indicators in FIG. 4, in other examples, reference indicators may be numerals, pictures, text, and others.

Here, page 410 contains text box rectangle 412 and text box rectangle 416. As an example, page 410 contains two text boxes which had non-visible content in printed file 400. Text box rectangle 412 has text that exceeds the width of its boundaries or bounding box. Thus, the content of text box rectangle 412 is replaced with reference indicator 414 on printed page 410. Text box rectangle 416 had text which exceeded the height of the text box rectangle. Thus, the content of text box rectangle 416 is replaced with reference indicator 418 on printed page 410.

Page 420 contains text box rectangle 422 and text box rectangle 426. As an example, page 420 includes two text boxes, one without non-visible content and one with non-visible content in printed file 400. Text box rectangle 422 has text box content 424 which did not exceed the boundaries of the text box rectangle 422. Since text box rectangle 422 did not have non-visible text in printed file 400, the entire text box content 424 may be printed with no modification on page 420. Text box rectangle 426 has a scrollbar in printed file 400, indicating that the content exceeds the width or height of text box rectangle 426. Thus, the content of text box rectangle 426 is replaced with reference indicator 428 on printed page 420.

Page 430 contains reference indicators 414, 418, and 428, which are substantially situated with corresponding text box contents 432, 434, and 436, respectively. In some examples, page 430 may be called a reference guide. Here, the visible and non-visible content of the text boxes is printed substantially situated with the corresponding reference indicator. Reference indicator 414, also shown on page 410, may be used to identify text box content 432 as the visible and non-visible content of text box rectangle 412. Similarly, reference indicator 418, also shown on page 410, indicates that text box content 434 is the visible and non-visible content of text box rectangle 416. Similarly, reference indicator 428, also shown on page 420, indicates that text box content 436 is the visible and non-visible content of text box rectangle 426. In other examples, system 400 and the above-described elements may be varied and are not limited to the functions, structures, configurations, or implementations provided.

Figure 5:
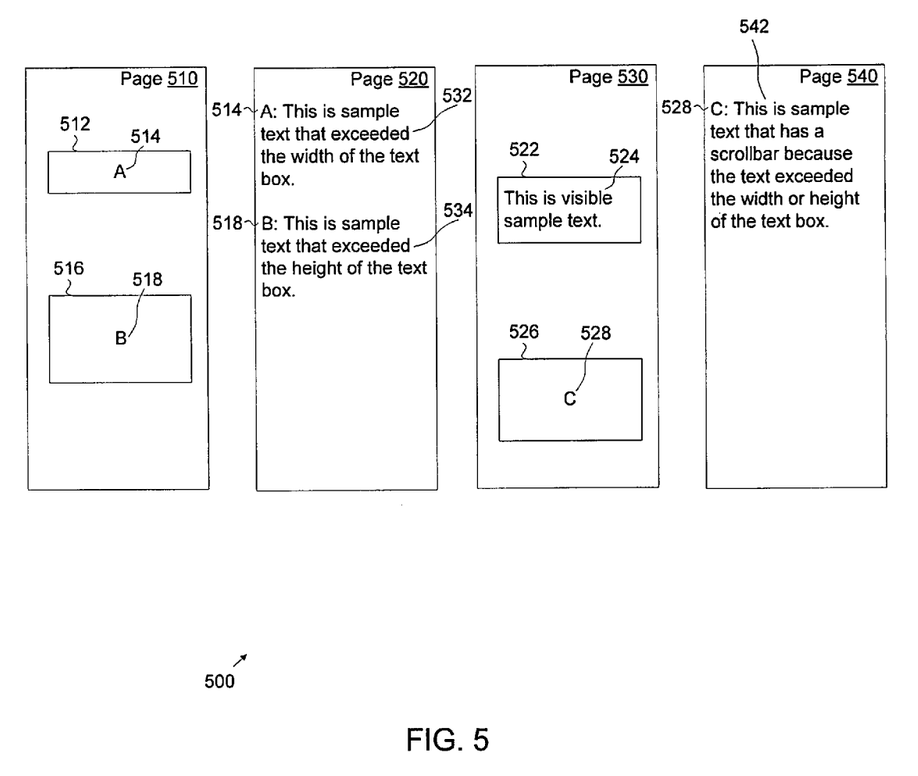
FIG. 5 illustrates an alternative exemplary printed file.

FIG. 5 illustrates an alternative exemplary printed file. Here, printed file 500 includes page 510, text box rectangle 512, text box rectangle 516, reference indicator 514, reference indicator 518, page 520, text box content 532, text box content 534, page 530, text box rectangle 522, text box rectangle 526, text box content 524, reference indicator 528, page 540, and text box content 542. Page 510 and page 530 are pages from printed file 500, and page 520 and page 540 are new pages in printed file 500. Here, pages 520 and 540, which include the content of text box rectangles 512, 516, and 526, are inserted following pages 510 and 530 for ease of reference. In some examples, page 520 may be more than one printed page if visible and non-visible text box contents 532-534 exceed one page in length. In other examples, page 540 may be more than one printed page if visible and non-visible text box content 542 exceeds one page in length. In yet other examples, file 500 may contain more or fewer text boxes. Although letters are used as reference indicators in FIG. 5, in other examples, reference indicators may be implemented using numerals, pictures, text, and others.

Here, page 510 contains text box rectangle 512 and text box rectangle 516. As an example, page 510 includes two text boxes that have non-visible content in printed file 500. In some examples, text box rectangle 512 has text that exceeds the width of the text box rectangle. Thus, the content of text box rectangle 512 is replaced with reference indicator 514 on printed page 510. Text box rectangle 516 has text that exceeds the height of the text box rectangle. Thus, the content of text box rectangle 516 may be replaced with reference indicator 518 on printed page 510.

Page 520 includes reference indicators 514 and 518, which may be substantially situated with corresponding text box contents 532 and 534, respectively. In some examples, page 520 may be part of a reference guide. Here, visible and non-visible content of text boxes (e.g., text box rectangles 512, 516, 522, and 526) is printed substantially situated with the corresponding reference indicator. Reference indicator 514, also shown on the preceding page 510, indicates that text box content 532 is the visible and non-visible content of text box rectangle 512. Similarly, reference indicator 518, also shown on the preceding page 510, indicates that text box content 534 is the visible and non-visible content of text box rectangle 516.

Page 530 includes text box rectangle 522 and text box rectangle 526. As an example, page 530 includes two text boxes, one without non-visible content and one with non-visible content in printed file 500. Text box rectangle 522 has text box content 524 which did not exceed the boundaries of the text box rectangle 522. Since text box rectangle 522 did not have non-visible text in printed file 500, the entire text box content 524 may be printed with no modification on page 530. Text box rectangle 526 had a scrollbar in printed file 500, indicating that the content exceeded the width or height of text box rectangle 526. Thus, the content of text box rectangle 526 is replaced with reference indicator 528 on page 530.

Page 540 contains reference indicator 528, which is substantially situated with corresponding text box content 542. In some examples, page 540 may be part of a reference guide. Here, visible and non-visible content of text box 526 is printed substantially situated with the corresponding reference indicator. Reference indicator 528, also shown on page 530, indicates that text box content 542 includes visible and non-visible content of text box rectangle 526. In other examples, system 500 and the above-described elements may be varied and are not limited to the functions, structures, configurations, or implementations provided.

Figure 6:
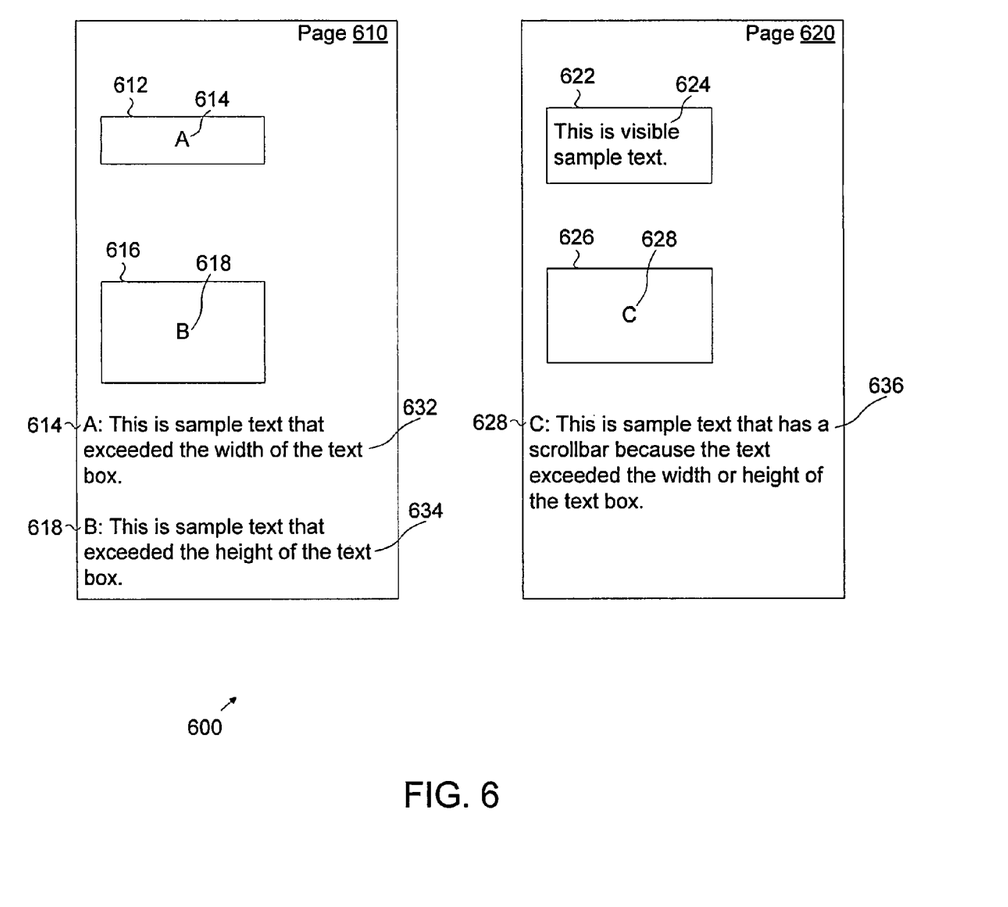
FIG. 6 illustrates yet another alternative exemplary printed file.

FIG. 6 illustrates yet another alternative exemplary printed file. Here, printed file 600 includes page 610, text box rectangle 612, reference indicator 614, text box rectangle 616, reference indicator 618, page 620, text box rectangle 622, text box content 624, text box rectangle 626, reference indicator 628, text box content 632, text box content 634, and text box content 636. Pages 610 and 620 include visible and non-visible content of the text boxes. Here, visible and non-visible content of text boxes 612, 616, and 626 is printed on the same page as pages 610 and 620 of printed file 600, respectively, for ease of reference. In some examples, a page size may be selected to print printed file 600; then pages 610 and 620 may have 80% of the available page space allocated content and 20% of the remaining page space allocated for visible and non-visible content of text boxes 612, 616, 622, and 626. In other examples, different percentages of pages 610 or 620 may be allocated for printed file 600 and visible and non-visible content of text boxes 612, 616, 622, and 626. Here, although visible and non-visible content of text boxes 612, 616, 622, and 626 is shown at the bottom of pages 610 and 620, visible and non-visible content of text boxes 612, 616, 622, and 626 may be printed at the top, in another margin (e.g., right, left, bottom). In yet other examples, file 600 may contain more or fewer text boxes. Although letters are used as reference indicators in FIG. 6, in other examples, reference indicators may be numerals, pictures, text, and others.

Here, page 610 contains text box rectangle 612 and text box rectangle 616. As an example, page 610 includes two text boxes that have non-visible content in printed file 600. Text box rectangle 612 may include text that exceeds the width of its bounding box. Thus, the content of text box rectangle 612 may be replaced with reference indicator 614. Likewise, text box rectangle 616 may include text that exceeds the height of its bounding box. Thus, the content of text box rectangle 616 may be replaced with reference indicator 618. Page 610 also includes reference indicators 614 and 618 at the bottom of the page, as shown. Reference indicators 614 and 618 are substantially situated with corresponding text box contents 632 and 634, respectively. The visible and non-visible content of the text boxes is printed substantially situated with the corresponding reference indicator. Reference indicator 614, also shown in text box rectangle 612, indicates that text box content 632 includes visible and non-visible content of text box rectangle 612. Similarly, reference indicator 618, also shown in text box rectangle 616, indicates that text box content 634 is visible and non-visible content of text box rectangle 616.

In some examples, page 620 includes text box rectangle 622 and text box rectangle 626. As an example, page 620 includes two text boxes, one without non-visible content and one with non-visible content in printed file 600. Text box rectangle 622 has text box content 624, which may not exceed the bounding box (i.e., boundaries) of text box rectangle 622. Since text box rectangle 622 does not have non-visible text in printed file 600, text box content 624 may be printed on page 620 within text box rectangle 622. Further, text box rectangle 626 may be implemented with a scrollbar in printed file 600, indicating that the content exceeds the width or height of text box rectangle 626. Thus, the content of text box rectangle 626 may be replaced with reference indicator 628 on printed page 620. At the bottom of page 620, reference indicator 628 may also be printed, which is substantially situated with corresponding text box content 636. Here, visible and non-visible content of text box 626 is printed substantially situated with the corresponding reference indicator. Reference indicator 628, also shown in text box rectangle 626, indicates that text box content 636 is the visible and non-visible content of text box rectangle 626. In other examples, system 600 and the above-described elements may be varied and are not limited to the functions, structures, configurations, or implementations provided.

Figure 7:
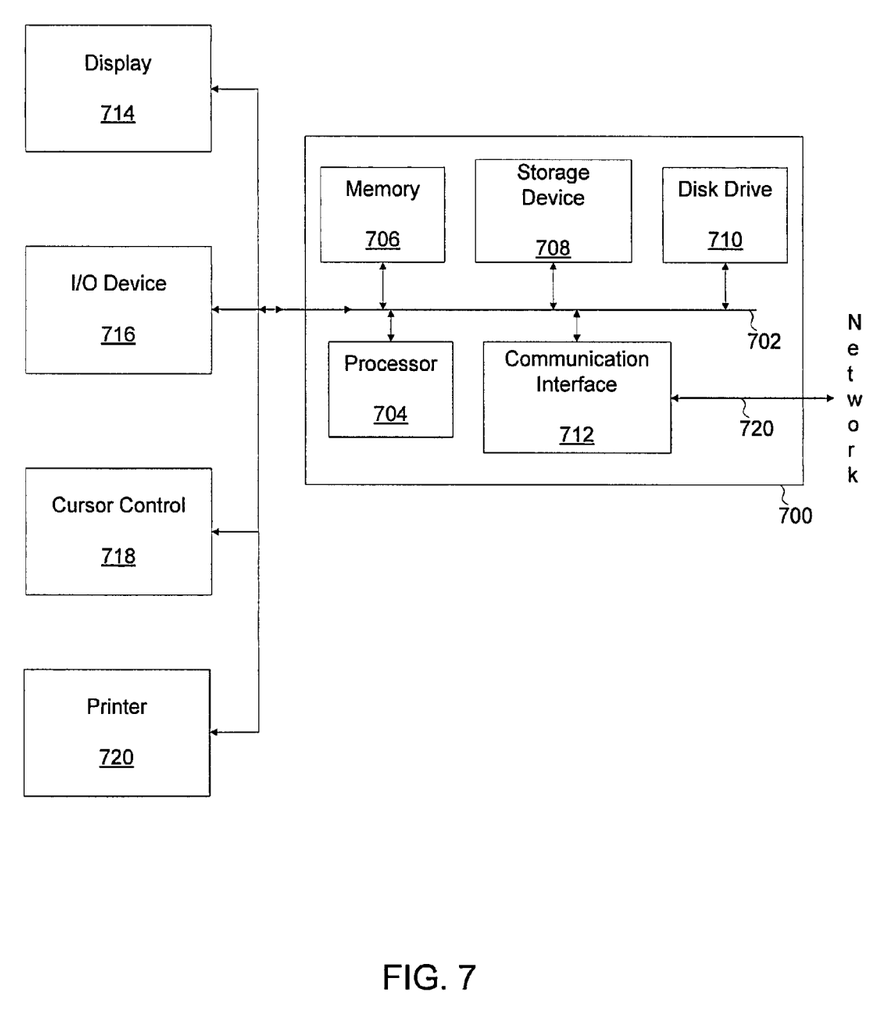
FIG. 7 illustrates an exemplary computer system suitable for file printing.

FIG. 7 illustrates an exemplary computer system suitable for file printing. In some examples, computer system 700 may be used to implement computer programs, applications, methods, processes, or other software to perform the above-described techniques. Computer system 700 includes a bus 702 or other communication mechanism for communicating information, which interconnects subsystems and devices, such as processor 704, system memory 706 (e.g., RAM), storage device 708 (e.g., ROM), disk drive 710 (e.g., magnetic or optical), communication interface 712 (e.g., modem or Ethernet card), display 714 (e.g., CRT or LCD), input device 716 (e.g., keyboard), cursor control 718 (e.g., mouse or trackball), and printer 720.

According to some examples, computer system 700 performs specific operations by processor 704 executing one or more sequences of one or more instructions stored in system memory 706. Such instructions may be read into system memory 706 from another computer readable medium, such as static storage device 708 or disk drive 710. In some examples, hard-wired circuitry may be used in place of or in combination with software instructions for implementation.

The term "computer readable medium" refers to any medium that participates in providing instructions to processor 704 for execution. Such a medium may take many forms, including but not limited to, non-volatile media, volatile media, and transmission media. Non-volatile media includes, for example, optical or magnetic disks, such as disk drive 710. Volatile media includes dynamic memory, such as system memory 706. Transmission media includes coaxial cables, copper wire, and fiber optics, including wires that comprise bus 702. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 700. According to some examples, two or more computer systems 700 coupled by communication link 720 (e.g., LAN, PSTN, or wireless network) may perform the sequence of instructions in coordination with one another. Computer system 700 may transmit and receive messages, data, and instructions, including program, i.e., application code, through communication link 720 and communication interface 712. Received program code may be executed by processor 704 as it is received, and/or stored in disk drive 710, or other non-volatile storage for later execution.

In some examples, computer system 700 may interface with a printer through communication link 720 and communication interface 712. In other examples, computer system 700 may be coupled to printer 720 by bus 702 or another communication mechanism for communicating information. In yet other examples, system 700 and the above-described elements may be varied and are not limited to the functions, structures, configurations, or implementations provided.

The foregoing examples have been described in some detail for purposes of clarity of understanding, but are not limited to the details provided. There are many alternative ways and techniques for implementation. The disclosed examples are illustrative and not restrictive.

What is claimed:

1. A method, comprising:
performing, by a computer:
    detecting a plurality of text boxes disposed in a file;
    determining whether each of the text boxes includes content comprising either visible content or both visible and nonvisible content within boundaries of each of the respective text boxes; and
    retrieving first content from at least one of the plurality of text boxes;
    generating a printout of the file, in the event the first content comprises visible content, the printout comprising the file and the visible content disposed within the text box; in the event the first content comprises visible and nonvisible content, the printout comprising the file and an indicator disposed in at least one of the plurality of text boxes indicating that the visible and nonvisible content is printed outside one or more of the boundaries of the at least one of the plurality of text boxes.

2. The method of claim 1, wherein the plurality of text boxes include at least one form field.

3. The method of claim 2, wherein the at least one form field is configured to receive user input.

4. The method of claim 2, wherein the at least one form field is identified by a tag.

5. The method of claim 1, wherein detecting the plurality of text boxes with visible and non-visible content further comprises retrieving a width and a height of a bounding box of at least one of the plurality of text boxes.

6. The method of claim 5, further comprising computing a total height of the visible and non-visible content of the at least one of the plurality of text boxes.

7. The method of claim 6, further comprising comparing the total height of the visible and non-visible content of the at least one of the plurality of text boxes with the height of the bounding box of the at least one of the plurality of text boxes.

8. The method of claim 1, further comprising computing a maximum width of the visible and non-visible content of the at least one of the plurality of text boxes, wherein the maximum width is selected from a set comprising the width of each line in the file.

9. The method of claim 1, further comprising computing the maximum width of the visible and non-visible content of the at least one of the plurality of text boxes with the width of the bounding box of the at least one of the plurality of text boxes.

10. The method of claim 1, wherein detecting the plurality of text boxes with visible and non-visible content further comprises detecting a scrollbar associated with the at least one of the plurality of text boxes.

11. The method of claim 1, wherein the printout comprises a reference guide.

12. The method of claim 11, wherein the reference guide comprises the visible and non-visible content of the at least one of the plurality of text boxes.

13. The method of claim 1, wherein a copy of the indicator is substantially situated with the visible and non-visible content of the at least one of the plurality of text boxes in the printout.

14. The method of claim 1, wherein generating the printout further comprises:
 printing a page of the file comprising the at least one of the plurality of text boxes, the page being printed in an area of the printout; and
 printing the visible and non-visible content of the at least one of the plurality of text boxes, the visible and non-visible content being printed in another area of the printout.

15. A method, comprising:
 performing, by a computer:
  detecting a first text box disposed in a file having first visible content;
  detecting a second text box disposed in the file having second visible content and nonvisible content within boundaries of the second text box;
  receiving an indication to print the file;
  in response to receiving the indication, generating a printout comprising:
   the file,
   the first visible content disposed in the first text box,
   an indicator disposed within the second text box that indicates that the second visible content and the nonvisible content is printed outside one or more boundaries of the second text box, and
   the second visible content and nonvisible content outside one or more of the boundaries of the second text box.

16. The method of claim 15, wherein the plurality of text boxes include at least one form field.

17. The method of claim 16, wherein the at least one form field is configured to receive user input.

18. The method of claim 15, wherein the at least one form field is identified by a tag.

19. The method of claim 15, wherein detecting the plurality of text boxes with visible and non-visible content further comprises retrieving a width and a height of a bounding box of at least one of the plurality of text boxes.

20. The method of claim 19, further comprising computing a total height of the visible and non-visible content of the at least one of the plurality of text boxes.

21. The method of claim 20, further comprising comparing the total height of the visible and non-visible content of the at least one of the plurality of text boxes with the height of the bounding box of the at least one of the plurality of text boxes.

22. The method of claim 19, further comprising computing a maximum width of the visible and non-visible content of the at least one of the plurality of text boxes by determining a width of each line in the file, wherein the maximum width is selected from a set comprising the width of each line.

23. The method of claim 19, further comprising computing the maximum width of the visible and non-visible content of the at least one of the plurality of text boxes with the width of the bounding box of the at least one of the plurality of text boxes.

24. The method of claim 15, wherein detecting the plurality of text boxes with visible and non-visible content further comprises detecting a scrollbar associated with the at least one of the plurality of text boxes.

25. The method of claim 15, wherein the printout comprises a reference guide.

26. The method of claim 25, wherein the reference guide comprises the visible and non-visible content of the at least one of the plurality of text boxes.

27. The method of claim 15, wherein a copy of the indicator is substantially situated with the visible and non-visible content of the at least one of the plurality of text boxes in the printout.

28. The method of claim 15, wherein generating the printout further comprises:
 printing a page of the file comprising the at least one of the plurality of text boxes, the page being printed in an area of the printout; and
 printing the visible and non-visible content of the at least one of the plurality of text boxes, the visible and non-visible content being printed in another area of the printout.

29. A computer program product embodied in a non-transitory computer readable medium and comprising computer instructions for:
 detecting a plurality of text boxes disposed in a file;
 determining whether each of the text boxes includes content comprising either visible content or both visible and nonvisible content within boundaries of each of the respective text boxes;
 retrieving first content from at least one of the plurality of text boxes; and
 generating a printout of the file, in the event the first content comprises visible content, the printout comprising the file and the visible content disposed within the text box;
 in the event the first content comprises visible and non-visible content, the printout comprising the file and an indicator disposed in at least one of the plurality of text boxes indicating that the visible and nonvisible content is printed outside one or more of the boundaries of the at least one of the plurality of text boxes.

30. A computer program product embodied in a non-transitory computer readable medium and comprising computer instructions for:
 detecting a first text box disposed in a file having first visible content;
 detecting a second text box disposed in the file having second visible content and nonvisible content;
 receiving an indication to print the file;
 in response to receiving the indication, generating a printout comprising:
  the file,
  the first visible content disposed in the first text box,
  an indicator disposed within the second text box that indicates that the entirety of the second visible content and the nonvisible content is printed outside one or more boundaries of the second text box, and the second visible content and nonvisible content outside one or more boundaries of the second text box.

* * * * *